No. 715,412. Patented Dec. 9, 1902.
L. PAGET.
STORAGE BATTERY.
(Application filed Sept. 8, 1899.)
(Specimens.)
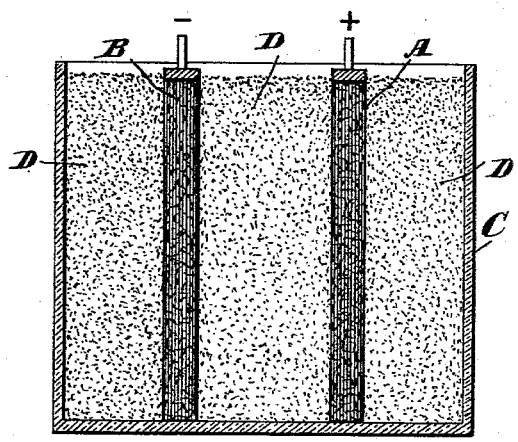
Attest:
T. F. Kehoe
Geo. M. Borst
Inventor:
Leonard Paget
By Philipp, Phelps & Sawyer
Attys

UNITED STATES PATENT OFFICE.

LEONARD PAGET, OF NEW YORK, N. Y., ASSIGNOR, BY MESNE ASSIGNMENTS, TO CHARLES COSTER, OF NEW YORK, N. Y.

STORAGE BATTERY.

SPECIFICATION forming part of Letters Patent No. 715,412, dated December 9, 1902.

Application filed September 8, 1899. Serial No. 729,836. (Specimens.)

*To all whom it may concern:*

Be it known that I, LEONARD PAGET, a citizen of the United States, residing at New York, county of New York, and State of New York, have invented certain new and useful Improvements in Storage Batteries and Battery Materials, fully described and represented in the following specification and the accompanying drawings, forming a part of the same.

The present invention relates to an improved construction of storage battery, and especially to the absorbent material for holding the battery-electrolyte.

I have discovered that important advantages are secured in storage batteries by the use of certain silicated material known as "tufa" as an absorbent material for holding the sulfuric acid or other electrolyte of the battery. This silicated tufa is a crypto crystalline calcic carbonate of cellular construction, which is usually of volcanic origin, but is sometimes depositied also in the beds of springs and streams. My analyses have shown that such tufa contains a small proportion of silicates thoroughly disseminated throughout the mass, thus forming what might properly be called a "silicated tufa," although the simple term "tufa" is usually applied thereto and will be used in this specification as meaning such silicated tufa. I preferably use the tufa obtained from Italian sources and have secured excellent results with hill or mound deposits found in the neighborhood of Civita Vecchia, probably of volcanic origin. Among the many important advantages of tufa for this purpose as compared with materials heretofore employed or suggested as absorbent materials in storage batteries are the following:

Tufa is very light and of very high absorbent quality, so that a very heavy acid may be used and the absorbent material and acid have no greater weight, bulk for bulk, than a liquid electrolyte of low weight, either alone or with the absorbent materials now employed. This enables an acid of low resistance to be used, thus reducing the internal or waste work of the current.

Tufa acts to prevent the occurrence of fumes in charging a battery, so that a very heavy current may be used in charging without the objectional fumes, which have necessitated the use of lighter currents in charging batteries employing other absorbent materials.

Tufa is not subject to the attack of the persulfuric acid formed in a storage battery during charging, and the weakening of the acid resulting from such attack of organic matter in absorbent material is thus avoided.

Tufa retains unchanged in the acid its size of particles and porosity, and these are excellently adapted for the purpose of absorbent material. This is very important, as it is desirable that the particles be of just the proper size, so as to hold properly a large quantity of acid. A very fine absorbent material prevents the proper action of the battery, while an absorbent material that is too coarse allows too much free acid, with the objectionable results of splashing of the acid, fumes in charging, and greater sulfation of the plates when the battery is standing. Other absorbent materials heretofore used, such as Kiesselguhr and pumice, are liable to break up under the action of the persulfuric acid formed in the battery and become powder, so as to form with the acid a thin mud-like material.

Tufa possesses an important advantage with plates made of or faced with oxid of lead or similar finely-divided material on account of the tufa not being disintegrated by the acid, so that tufa forms a firm and solid support for the material of such plates, supporting the material on grids where pasted plates are used and enabling the use of plates formed wholly of such materials without supporting-grids to be employed. The tufa therefore performs a special function in connection with plates formed wholly or partially of finely-divided material, and such battery constructions form a specific feature of the invention.

Tufa also enables acid to be used of such specific weight as to be above the point of maximum conductivity, and thus uniformity of voltage may be secured in the discharging-current if the outside circuit be maintained uniform, as the decrease of voltage of the battery-plates in discharge is compensated for by the drop in internal resistance of the acid as the latter decreases in specific weight.

My absorbent material may be applied in storage batteries of various classes and forms. For the purpose of illustration, however, I have shown in the accompanying drawing a battery having positive and negative electrodes A B contained within the casing C, with the spaces between the electrodes and between the electrodes and the casing filled with tufa D, holding the electrolyte. The electrodes A B are shown as formed wholly of finely-divided active material, which may be and preferably is oxid of lead before forming or charging and one of the electrodes finally being peroxid of lead and the other reduced lead, and the electrolyte is preferably a solution of sulfuric acid of the desired specific weight. It will be understood, however, that any suitable metallic or other support for the active material may be used.

The electrolyte may be combined with the tufa in the battery in any suitable manner, or the tufa with the electrolyte absorbed therein may be made and sold independently of the battery. Such battery material consisting of tufa with sulfuric acid or other electrolyte absorbed therein may be used in other batteries besides storage batteries, and such use is within the invention broadly considered; but especial functions are secured by the use of tufa in secondary or storage batteries, and such battery constructions are claimed specifically.

What I claim is—

1. A storage battery having an absorbent material for the electrolyte consisting of silicated tufa.

2. A storage battery in which sulfuric acid forms the electrolyte of the battery and is contained in a body of silicated tufa.

3. In a storage battery, the combination with a battery-electrode, of a body of silicated tufa containing the battery-electrolyte therein and forming a support for the face of the active material.

4. In a storage battery, the combination with a battery-electrode in which oxid of lead forms the active material, of a body of silicated tufa containing the battery-electrolyte and forming a support for the face of the active material, substantially as described.

5. In a storage battery, the combination with a battery-electrode in which finely-divided material forms the active material, of a body of silicated tufa containing the battery-electrolyte and forming a support for the face of the active material, substantially as described.

6. Silicated tufa containing a battery-electrolyte or material adapted to form a battery-electrolyte, substantially as described.

7. A battery material consisting of silicated tufa with sulfuric acid absorbed therein, substantially as described.

In testimony whereof I have hereunto set my hand in the presence of two subscribing witnesses.

LEONARD PAGET.

Witnesses:
C. J. SAWYER,
T. F. KEHOE.